United States Patent
Funch et al.

(10) Patent No.: US 7,969,411 B2
(45) Date of Patent: Jun. 28, 2011

(54) OPERATING PANEL

(75) Inventors: Knud Funch, Thisted (DK); Kaj Nielsen, Thyholm (DK)

(73) Assignee: Bang & Olufsen A/S, Struer (DK)

( * ) Notice: Subject to any disclaimer, the term of this patent is extended or adjusted under 35 U.S.C. 154(b) by 904 days.

(21) Appl. No.: 11/660,984

(22) PCT Filed: Aug. 23, 2005

(86) PCT No.: PCT/DK2005/000537
§ 371 (c)(1),
(2), (4) Date: Oct. 15, 2007

(87) PCT Pub. No.: WO2006/021211
PCT Pub. Date: Mar. 2, 2006

(65) Prior Publication Data
US 2008/0192002 A1    Aug. 14, 2008

(30) Foreign Application Priority Data
Aug. 23, 2004  (DK) .................................. 2004 01270

(51) Int. Cl.
*G09G 5/00*        (2006.01)

(52) U.S. Cl. ...................................................... 345/156

(58) Field of Classification Search .......... 345/156–159, 345/173–174, 176, 178, 184
See application file for complete search history.

(56) References Cited

U.S. PATENT DOCUMENTS

| | | | | |
|---|---|---|---|---|
| 5,038,401 | A | * | 8/1991 | Inotsume ........................ 455/92 |
| 5,804,780 | A | | 9/1998 | Bartha |
| 2002/0000971 | A1 | | 1/2002 | Armstrong |
| 2002/0027547 | A1 | | 3/2002 | Kamijo et al. |
| 2003/0206202 | A1 | | 11/2003 | Eser et al. |
| 2004/0100448 | A1 | * | 5/2004 | Moshrefzadeh .............. 345/173 |
| 2004/0132498 | A1 | * | 7/2004 | Clabunde et al. ............. 455/566 |

FOREIGN PATENT DOCUMENTS

| | | | |
|---|---|---|---|
| JP | 09-167541 | * | 6/1997 |
| JP | 2000/222129 | | 8/2000 |
| JP | 2003/015796 | | 1/2003 |
| JP | 2003/099198 | | 4/2003 |
| WO | WO 00/57975 | | 10/2000 |

* cited by examiner

*Primary Examiner* — Alexander S Beck
*Assistant Examiner* — Kenneth Bukowski
(74) *Attorney, Agent, or Firm* — James Creighton Wray

(57) ABSTRACT

The present invention provides an input device where the input, is created by translating a front plate in relation to the chassis such that the translation movement may easily be controlled, and at the same time, due to the freedom built into the device, any level of menu control and selection criteria may be provided.

7 Claims, 4 Drawing Sheets

OPERATING PANEL

This application claims the benefit of Danish Application No. PA 2004 01270 filed Aug. 23, 2004 and PCT/DK2005/000537 filed Aug. 23, 2005, which are hereby incorporated by reference in their entirety.

BACKGROUND OF THE INVENTION

The present invention relates to an input device for a consumer electronic device or an input device for controlling other devices such as computers (replacing mouse/joy sticks), buttons/knobs in cars, air planes, vessels or vehicles. Generally, the input device may be used in place of a number of well-known input means, as will be evident from the accompanying description.

Various input devices in the shape of built-in controls or remote controls are known in the art for controlling electronic devices such as television sets, radios, auto hi-fi, computers, VCRs, DVDs etc. Also, for personal computers, palm tops and the like, a number of input devices such as joy sticks and mouse devices are well-known.

The commonly known remote controls usually comprise a number of push buttons which are used in order to select the appropriate channel or to increase the volume, etc. Some remote controls are furthermore equipped with small devices similar to a joy stick which may be manipulated in one or more directions in order to select menus on a screen on the electronic device which it is controlling. It is also known in the art to have devices wherein a wheel is provided such that leafing through a menu may be achieved by rotating the wheel, and then by either depressing the wheel or depressing a button provided on the remote control a selection among the items on the screen may be carried out.

A number of devices are know where input is created by displacing for example a top section or by pressing on a member, a so called touch screen or screens where piezo electric elements are activated in response to an input from a user.

One example of such a device is known from US2003/0206202 where a touch screen is mounted in a frame. The frame may be displaced in relation to the device in order to control the movement of a cursor in the screen. When the cursor has been manipulated into a desired position corresponding to the desired input, the screen may be touched, whereby the desired input is registered in a manner known in the touch screen technology. Piezo electrical elements (contacts) may be provided along the edges of the frame in order to register the movements of the screen in relation to the rest of the device. Variable inputs may be generated depending on how the touch screen is pre-programmed.

Another type of device is known from JP2003-15796. In this device the input device is made from a flexible material such that by deflecting the screen underlying contacts are activated, whereby an input is generated. Further the input device may be slid in two perpendicular directions in order to navigate the cursor into the desired position before activating the underlying contacts by deflecting the screen.

Another example is known from U.S. Pat. No. 5,804,780. In this device a touch screen comprising piezo electrical contacts is arranged on two perpendicular axles, such that by tilting the screen underlying contacts are activated in order to register the desired input.

A similar construction is known from JP2000222129.

Common for these devices are the complicated mechanical constructions, which to a large degree have to accommodate the electrical connections for the touch screen and/or the underlying contacts. The devices all combine movements in plane (along X and Y axis) with detection in a direction perpendicular to the plane (Z direction) by piezo electrical means in the shape of touch screens.

SUMMARY OF THE INVENTION

An object of the present invention is to provide a device where the input is created by translating a front plate in relation to the chassis such that the translation movement may easily be controlled, and at the same time, due to the freedom built into the device, any level of menu control and selection criteria may be provided. This type of input device is simple to use and an intuitive-to-operate device.

Other objects of the present invention will become obvious from the following description.

According to the present invention, an input device is provided wherein the input device has a front side, and a number of side faces and optionally a back side, where a front plate substantially covers the front face, where the front plate may be translated in relation to the front face in at least three dimensions, and that said front plate is provided with biasing means such that the plate is biased towards a first position from which the plate may be manipulated in the three dimensions, and that electronic circuitry is arranged in the device, where said electronic circuitry includes one or more switch devices, which switches are arranged to be activated by displacing the front plate, and thereby create/register an input.

From a user's point of view, the input device as described above is very simple to use in that the device for example may be held by hand and by using the thumb to slide the front plate in translated movements in relation to box structure, navigation through a menu may be accomplished very easily, simply by activating the switches in different directions whereby input is registered, and depending on the input the user may easily traverse through the hierarchy of the menus which has been pre-selected and pre-programmed in the device. By depressing the front plate, for example by squeezing the entire device, the device is manipulated in the third dimension such that micro switches arranged appropriately in the device will register such translation.

As an equal alternative to being a hand-held device, the device may be integrated in a piece of electronic equipment such that the front plate may be manipulated by a user in order to control the equipment (computer, hi-fi, TV, air-condition or whatever).

The front plate is generally moveable in a XY plane and in a direction Z perpendicular to this plane. The device may be provided with four, six, eight or more sides. The front plate may be translated in any direction in the XY plane perpendicular to a side. On the side inside the device, micro switches are arranged which are activated as the plate is translated in that particular direction (i.e. perpendicular to that side).

Generally, the micro switches need a very limited travel in order to be activated, typically 0.2-0.5 mm, depending on the make of switch.

In a further advantageous embodiment, the front plate may pivot relative to the back and side faces. Thereby the possibility is provided to further improve the feeling for the user of selecting or de-selecting items from the menu in that the translation movement may become true tridimentionally in that first, for example, a sideways movement of the front plate may be activated in order to select an item from the menu and thereafter depressing the front plate in relation to the rest of the device, for example by a pivoting motion of the front plate which may carry out and activate the actual input of the selected item.

For both the above mentioned embodiments, the biasing means will, as soon as the user releases pressure from the front plate, return the front plate to the first position such that a new and further input may be selected by further translation of the front plate in relation to the rest of the device.

The first position, i.e. the rest position of the front plate, is the position wherein the front plate is input-neutral. Typically, the front plate will be superposed over the device, and entirely covering the front side. As the front plate is translated in one of the directions, it will engage micro switches arranged appropriately in the device, and thereby create some kind of input. In order to further enhance the user-friendliness of the device, the actual micro switch means may be constructed with a certain tactile feel, such that a user will register a response from the front plate, when the front plate engages the switch and thereby a firm and decisive input order may be carried out by overcoming/registering this tactile feel.

In a further advantageous embodiment, the front plate is transparent, and optionally a plasma, LCD, LED or OLED screen may be arranged visible through the transparent front plate.

It is well-known in the art with traditional integrated or remote controls to have the selectable items, i.e. menus, for i.e. controlling the volume, brightness, colour, etc. of a television set displayed on the screen. In the same manner, the menu is illustrated on the screen of personal computers, and the selection is carried out by a mouse device by scrolling up and down and/or activating one or more of the mouse buttons, sometimes in combination and sometimes alone.

In this advantageous embodiment of the invention, the screen is provided integrated inside the input device such that a user does not need to be able to visually see the actual electronic device which is being controlled, but will have all options present in the input device. This may for example be control of the volume or selection of electronic A device where the input device may interface with more units, such as for example television sets, personal computers, radios, CD players, DVDs, etc. This embodiment of the invention may be used such that the front plate is a part of the exterior of the device such as an AV equipment both stationary and provided in vehicles.

By integrating the screen inside the input device in a minimized state which makes it possible to provide an input device which may be carried by hand, the user is provided with the possibility of selecting songs stored on a hard disc for being reproduced on the hi-fi, or films or other files stored on other media or the same hard disc to be presented on the input device.

Furthermore, it may also be possible to provide interface with a personal computer or similar, whereby access may be gained to the Internet, such that basic information may be transmitted through and from the input device, for example the listings of the different television stations may be presented on the screen such that a user can select and activate the program directory, which the user desires to watch.

The communication between the input device and the electronic equipment which is to be controlled may be provided in any known manner such as for example infrared, ultra sound, radio signals, Blue Tooth technology or any other well-known method.

By providing a screen integrated in the device, it is possible to further improve the usability of the device in that the input device may in a further advantageous embodiment be constructed such that the front plate may be a touch sensitive transparent screen. By being able to select layers in a hierarchy by the translation of the front plate in relation to the device, it may also be possible to select different layers in the hierarchy wherein virtual buttons may be present such that the screen may be configured to have any input level desirable. Therefore, a user may select for example activation of the radio device whereafter the screen will indicate a number of virtual buttons, for example No. 1 to 10, where each button will correspond to a pre-programmed radio station such that by touching the screen and thereby activating a button, for example No. 6, the radio station which has been pre-programmed into the electronic device, in this case a radio, will be activated. The virtual buttons may be pre-programmed to any desirable input option, whereby the versatility of the device is greatly improved in that in addition to selecting menus and items from these menus from a hierarchy presented on a screen, the menus may be translated into a series of equal levelled possibilities represented by the virtual buttons which the user thereafter may activate.

In an advantageous embodiment of the invention, the construction of the input device has a generally rectangular shape and is carried out such that the front plate is transparent and made from for example glass and that said front plate is connected to a first frame member, where said first frame member is connected by one or more first biasing members to a first guide rail, such that the front plate may move in a first direction relative to the guide rail, that said guide rail is provided with protrusions opposite the side which is facing the front plate, which protrusions are accommodated in grooves provided in a second guide rail, such that said first guide rail may be moved in a second direction perpendicular to the first direction relative to said second guide rail, where third biasing members are provided between said first and second guide rails thereby allowing relative movement in a second direction, and further that one or more second biasing members are provided between said first and second guide rails thereby allowing relative movement in a third direction perpendicular to said first and second directions between the first and second guide rails.

In this manner a very compact construction is achieved in that the different features necessary in order to provide the relative movements between the different parts are arranged substantially along the periphery of the device. This leaves room for the screen in the central section of the device. Furthermore, by providing micro switches appropriately arranged in the device, where the micro switches typically need to travel approximately 0.3 mm in order to be activated, the front plate only need a very slight movement in order to register an input.

As already explained above, the biasing means will return the front plate to its first position, i.e. the rest position, of the plate as soon as a user relieves the front plate of pressure. In this position, the device may advantageous be designed such that the edges of the front plate is substantially flush with the side faces of the device.

In a further advantageous embodiment of the construction mentioned above, the first guide rail is provided with one or more first slots in said first direction and one or more second slots in said third direction, and that said first frame member is provided with one or more taps arranged for engagement with said one or more first slots, and that said second guide rail is provided with one or more taps arranged for engagement with said one or more second slots, and that optionally a ball bearing may be arranged between the first frame member and the first guide rail. The provision of slots with corresponding taps limits the movement of the different relative moveable parts of the device such that the integrity of the device is assured. Although the biasing means may be of a type such that the integrity is substantially assured, the mechanical limitations provided by slots and taps provides a very robust and easy to manufacture and assemble structure. Furthermore, a user will not be able to overload the translation possibilities of the device, but will feel a firm stop at the end of the possible travel of the front plate in that particular direction. Also, by using slots and taps it becomes possible to use common springs as biasing means in that the movement of the front plate will be guided by the slots and taps such that the biasing means does not have any part in guiding the front plate, but only needs to provide the biasing force necessary in order to return the front plate to the first position once the pressure from the plate is relieved by the user.

In a further advantageous embodiment, a gyro unit is arranged inside the input device, which gyro unit will detect relative movements of the entire input device, and use this detected movement as input for controlling the electronic device.

The gyro unit will detect any kind of motion of the device such that for example a horizontal movement of the entire device will be detected by this gyro unit. Thereby, the electronic circuitry provided inside the input device may be programmed to detect input from the gyro unit such that for example, depending on the hierarchy which has been selected previously by the user, is influenced. An example of this may be that the volume control of an electronic device such as a television set, radio or the like, has been selected by the user. By elevating or lowering the entire device, the gyro unit is influenced whereby an input is generated, for example elevation of the unit will increase the volume and lowering of the unit will decrease the volume. Correspondingly, if the unit has been at rest, for example placed on a table top for a period of time, movement of the input device will be detected by the gyro unit, whereby the screen of the input device may be turned on. In this example the gyro unit has, therefore, also a built-in power safe mode, but the gyro units input due to movement of the entire device may, as described above, be used as input for any desired input to the electronic devices which a user wishes to control with the input device.

In a still further advantageous embodiment, the device is a remote control device communicating by wireless means with the electronic device. As is evident from the description, by supplying an internal source of energy and appropriate wireless communication means, the device may advantageously operate as a remote control unit. Furthermore, the device is provided with features superior to any comparable device.

Further advantageous embodiments of the invention are disclosed in the further claims attached to the application.

In the following, one embodiment of the invention will be explained in some detail, but the scope of protection shall not be limited by this particular embodiment, but the scope shall only be limited by the appended claims.

SHORT DESCRIPTION OF THE DRAWING

DETAILED DESCRIPTION OF THE DRAWING

Figure 1:
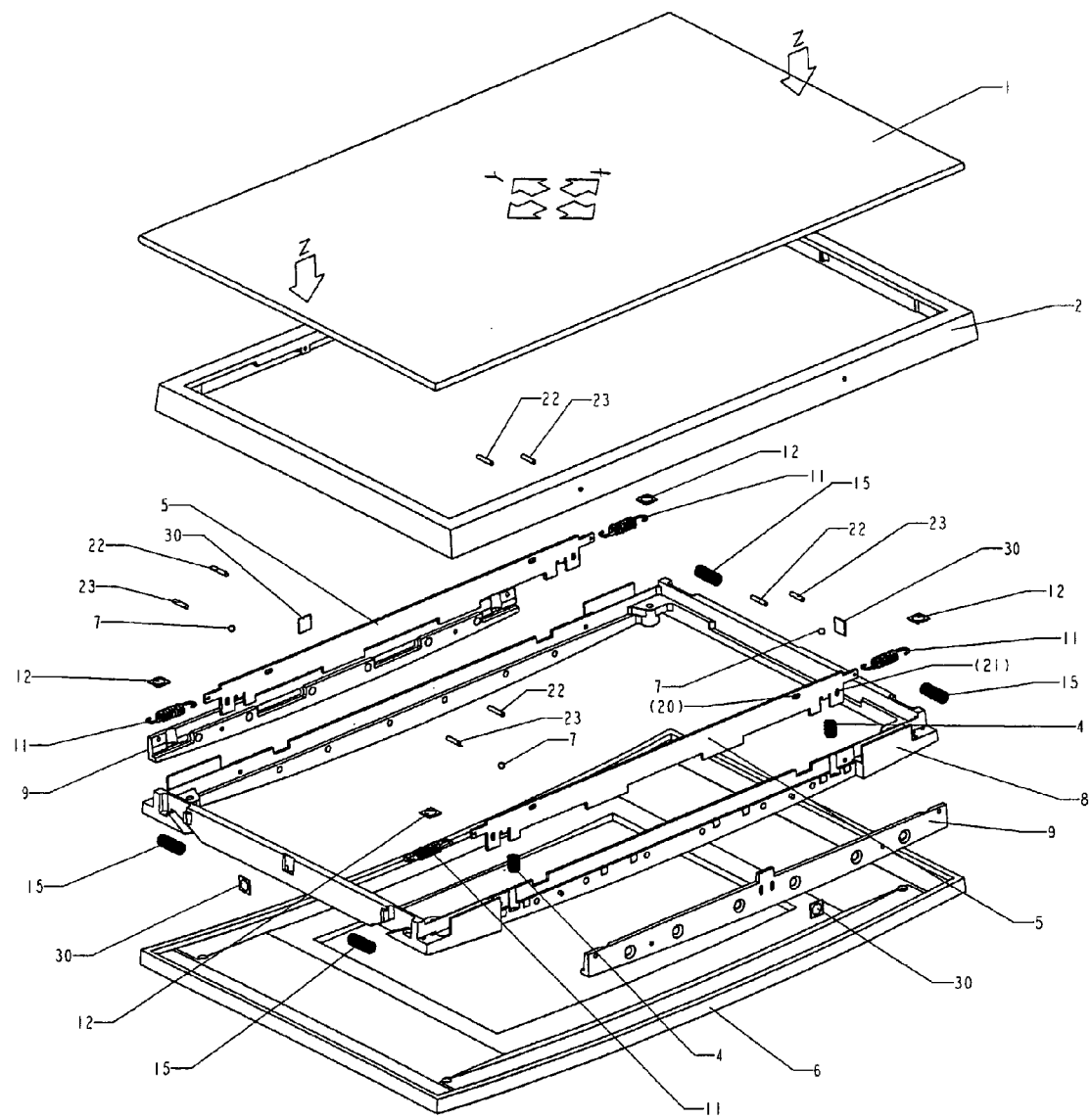
FIG. 1 illustrates a simplified schematic construction of the device.

In FIG. 1 is illustrated a simplified schematic construction of the device according to the invention. The input device comprises a front plate 1 which in this embodiment is made from a glass piece 1 connected for example by adhesive means to a first frame member 2. The first frame member is connected to a first guide rail 5 by means of first biasing means 11. The front plate 1 will therefore be able to move in a first direction X relative to the guide rail 5. The biasing means 11, in this example in the shape of spring members will return the front plate to a first position where the front plate 1 is at rest, i.e. the forces induced by the springs 11, are neutral on the front plate.

In order to obtain a stable construction, two guide rails 5 are provided at opposite sides of the front plate in order to reliably guide the front plate's travel in relation to the guide rails.

The guide rails 5 are in the device rest position, i.e. when no forces are impressed on the device, kept at a distance from a second guide rail 9, in this embodiment in the shape of a frame, by third biasing members 4. By pressing the front plate in the Z direction (indicated by arrows), the pressure will be translated from the front plate 1 through the guide rail 5 to the third biasing members 4, in this instance in the shape of springs.

Between the second guide rail 9 and the frame 2 of the front plate 1 a second biasing means 15 is arranged, which when the front plate is manipulated such that the front plate 1 is translated in the Y direction, the biasing means 15 will urge the front plate back to the first position once pressure is relieved from the front plate 1.

In order to enhance and facilitate the movement of the front plate 1, and in particular the first frame member 2 in relation to the first guide rail 5, balls 7 are provided such that sliding movement between the frame 2 and the guide rail 5 is facilitated. In the frame constituting the second guide rail 9, micro switches 30, 31 are provided. The micro switches 30 are arranged for receiving input by translating the first frame 2 in the X and Y directions. The micro switches 31 are arranged in order to register input deriving from movement of the front plate and the first frame member 2 in the set direction.

As is evident from the illustration in FIG. 1, the central space inside the second guide rail member 9 is open such that a suitable screen may be arranged in this space.

Figure 2:
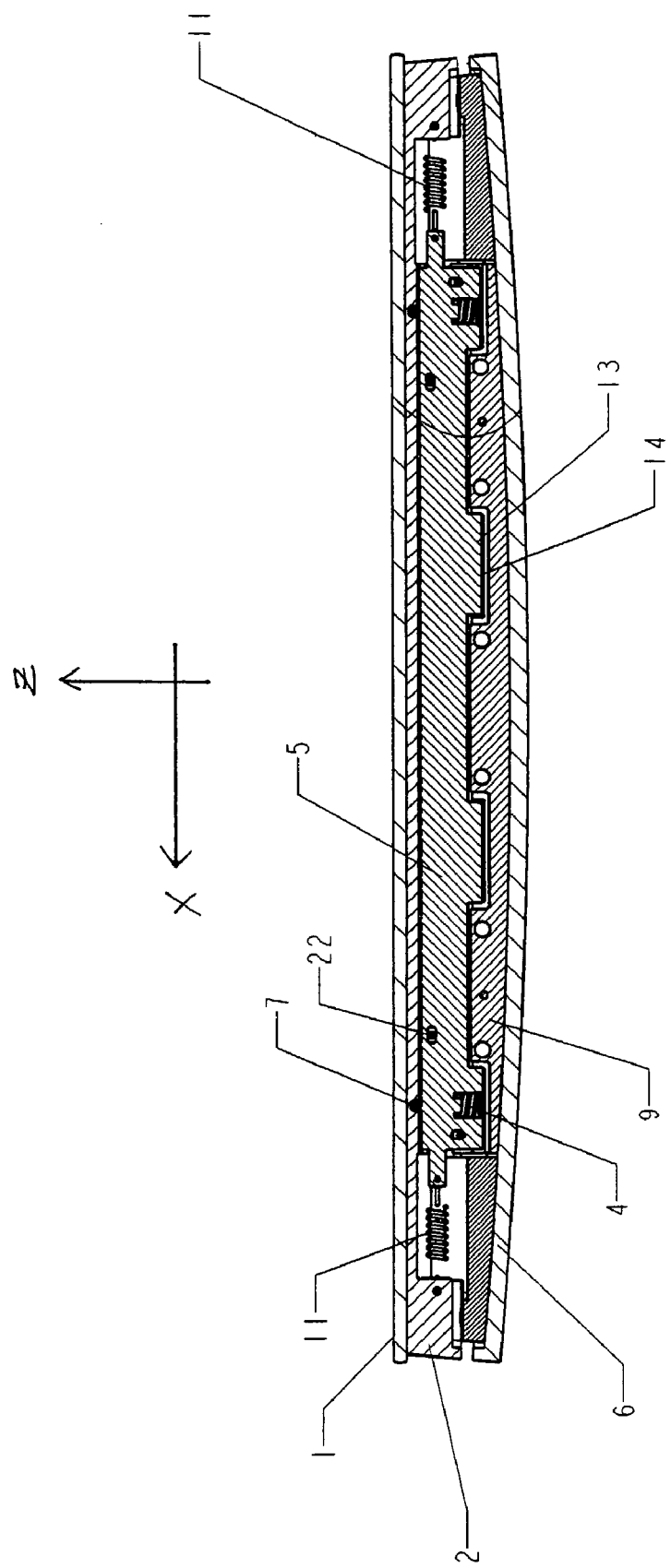
FIG. 2 illustrates a cross-section through the device.

Turning to FIG. 2, a cross-section through the device in the X direction is illustrated. Particular for this embodiment is the provision of the first guide rail 5 with protrusions 13 arranged at the opposite side of the guide rail 5 to which the first frame member 2 engages the first guide rail 5. In the second guide rail 9, grooves 14 slightly larger than the protrusion 13 in the first guide rail 5 are provided. The grooves 14 will accommodate the protrusion 13 with play such that it is possible to translate the guide rail 5 in the grooves 14 in order to activate the switches in the X direction.

In the Y direction, which is perpendicular to the plane of the figure, the grooves and the protrusions will guide the guide rail 5 to which the plate 1 and the frame 2 are connected. In this manner, translating the front plate 1 in the Y direction is controlled.

Figure 3:
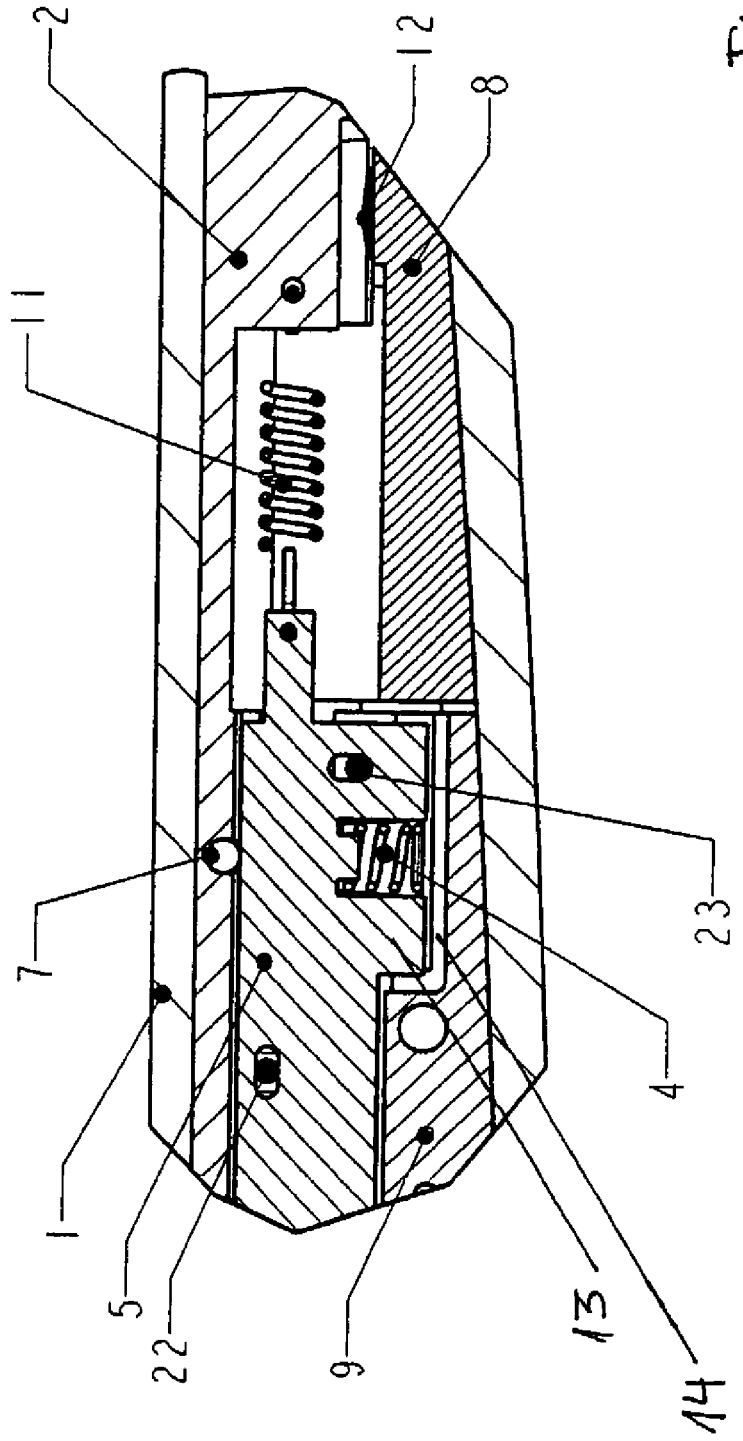
FIG. 3 illustrates a detail of the construction according to FIG. 2.

In FIG. 3, a detail of the construction according to FIG. 2 is illustrated. In addition to the features already explained with reference to FIG. 2, the additional features illustrated in FIG. 3 will be explained briefly. In order to maintain a distance in the Z direction, as indicated by the arrow, a third biasing member 4 has been provided. The biasing member 4 maintains a distance between the first guide rail 5 and the second guide rail 9 such that by depressing the front plate 1 in the Z direction, the biasing member, in this embodiment a spring 4, is depressed. This depression is registered by the micro switch 12 arranged between the first frame member 2 to which the front plate is adhered, and the second guide rail 9. In this embodiment, the second guide rail 9 has been divided into two sections such that one section 8 constitutes a chassis which is provided on order to mount the electronic circuitry, and optionally the screen, necessary in order to register and communicate the input from the user to the electronic device which is to be controlled by the invention.

In order to maintain the integrity of the device in the embodiments of the invention where traditional spring members are used for biasing means, a number of first slots 20 and second slots 21 are provided. The longitudinal extent of the first slots 20 is substantially in the X direction, and the longitudinal extent of the second slots 21 is substantially in the Z direction. By providing the first frame member 2 with corresponding taps 22, which may be accommodated in the first slots 20, the first frame member 2 and the first guide rail 5 cannot be displaced in the Z directions relative to each other, but only in the X direction due to the extent of the slots in this direction. Correspondingly, the second slots 21 are provided with their longitudinal direction in the Z direction such that taps 23 provided in the second guide rails 9 may engage the slots 21, and thereby the guide rail 9, will be able to move in the Z direction in the slot, whereas in the X direction relative displacement of the guide rail 5 and 9 is hampered due to the insertion of the taps 23 in the second slots 21.

Figure 4:
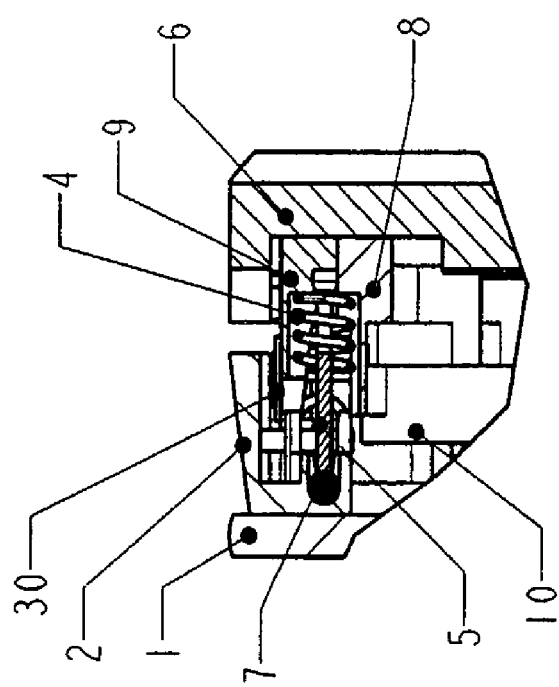
FIG. 4 illustrates the principle for providing and controlling movement in the Y direction.
Figure 4:
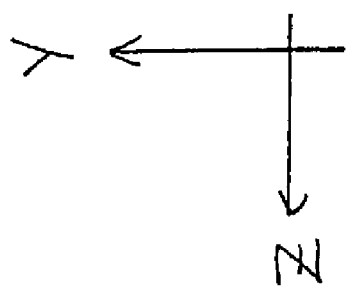

FIG. 4 illustrates the principle for providing and controlling movement in the Y direction. The first guide rail 5 is arranged such that it may tilt slightly to the right and to the left as seen in the figure. As the front plate 1 is translated right or left, i.e. the Y direction, this movement is limited by the ability of the guide rail 5 to move in the slot. The slot is limited by the second guide rail 9, and an upstanding section 8 of the second guide rail 9. In this embodiment the edge of the screen 10 may be seen arranged inside the guide frames 5, 9 and below the front plate 1 and the first frame member 2.

Although not illustrated, a gyro may be arranged inside the device, for example in the free space between the guide rails. The gyro will be able to detect/register movement of the entire device, i.e. if the device is moving upwards, sideways or the like. The gyro may in this manner provide input for the control of the electronic equipment corresponding to the micro switches.

With respect to all the embodiments depicted and described within this application, the electronic circuitry has not been illustrated for reasons of clarity, but it is understood that appropriate electronic circuitry, such as for example input sensors, micro processors, output indicators and actuators, user information displays and means for graphical presentation, system buses, and means for communicating with internal/external networks (Internet, LAN), signalled events and (status) messages may be provided in order to collect the input deriving from the micro switches and the gyro arranged in the device. Furthermore, all the necessary circuitry and software needed in order to provide the screen/display with appropriate information and treatment of input is also to be considered as comprised within the present application as the software and the presentation of this information, virtual buttons, different screens and menus all will be made according to the desires of the manufacturer of the input device.

The invention claimed is:

1. An input device for an electronic device, wherein said input device has a front side comprising a front face, a number of side faces depending therefrom, and a back face, where a front screen plate substantially covers said front face, where the front screen plate may be translated in relation to said front face and said side faces in at least three dimensions, and that said front screen plate is provided with biasing means such that said front screen plate is biased towards a first position from which the front screen plate may be manipulated in the three dimensions, and that electronic circuitry is arranged in the device, where said electronic circuitry includes one or more switch devices, wherein said switches are arranged to be activated by displacing the front screen plate, and thereby create/register an input, and wherein the front screen plate (1) is transparent and that said front screen plate is connected to a first frame member (2), where said first frame member (2) is connected by one or more first biasing members to a first guide rail (5), such that the front screen plate may move in a first direction (X) relative to the guide rail (5), that said guide rail is provided with protrusions (13) opposite the side which is facing the front screen plate (1), which protrusions are accommodated in grooves (14) provided in a second guide rail (9), such that said first guide rail (5) may be moved in a second direction (Y) perpendicular to the first direction (X) relative to said second guide rail (9), where third biasing members (15) are provided between said first and second guide rails (5,9) thereby allowing relative movement in a second direction (Y), and further that one or more second biasing members (4) are provided between said first and second guide rails (5,9) thereby allowing relative movement in a third direction (Z) perpendicular to said first and second directions (X,Y) between the first and second guide rails (5,9).

2. An input device according to claim 1, wherein the front screen plate may pivot relative to the back face and the side faces.

3. An input device according to claim 1, wherein the front screen plate is transparent, and that optionally a plasma, LCD, LED or OLED screen may be arranged visible through the transparent front screen plate.

4. An input device according to claim 1, wherein the front screen plate may be a touch sensitive transparent screen.

5. An input device according to claim 1, wherein the first guide rail is provided with one or more first slots (20) in said first direction (X) and one or more second slots (21) in said third direction (Z), and that said first frame member (2) is provided with one or more taps (22) arranged for engagement with said one or more first slots (20), and that said second guide rail (9) is provided with one or more taps (23) arranged for engagement with said one or more second slots (21), and that optionally a ball bearing may be arranged between the first frame member (2) and the first guide rail (5).

6. An input device according to claim 1, wherein a gyro unit is arranged inside the input device, which gyro unit will detect relative movements of the entire input device, and use this detected movement as input for controlling the electronic device.

7. An input device according to claim 1, wherein the input device is a portable remote control device communicating by wireless means with an electronic device.

* * * * *